United States Patent
Wann

(10) Patent No.: US 8,491,687 B1
(45) Date of Patent: Jul. 23, 2013

(54) HYDRAULIC FRACTURING TRUCK SAND BAGHOUSE

(76) Inventor: Jeremiah Wann, Jackson Center, PA (US)

(*) Notice: Subject to any disclaimer, the term of this patent is extended or adjusted under 35 U.S.C. 154(b) by 0 days.

(21) Appl. No.: 13/188,679

(22) Filed: Jul. 22, 2011

Related U.S. Application Data

(60) Provisional application No. 61/366,627, filed on Jul. 22, 2010.

(51) Int. Cl.
*B01D 50/00* (2006.01)

(52) U.S. Cl.
USPC ............ 55/356; 55/302; 166/267; 166/265; 166/271; 166/308.1

(58) Field of Classification Search
USPC ............ 55/385.1, 302, 341.1, 356, 319, 428, 55/432, 471, 472, 283, 309, 433, 467, DIG. 3; 15/314, 340, 345, 347, 352, 353, 348, 315, 15/300.1, 283; 95/280; 96/414, 426, 427; 209/133, 134; 406/139, 144, 146, 151, 152, 406/154, 155, 157, 168, 174, 175, 196; 166/254.2, 256, 267, 265, 271, 308.1; 222/189.06; 298/24; 291/3, 30, 38
See application file for complete search history.

(56) References Cited

U.S. PATENT DOCUMENTS

| | | | | |
|---|---|---|---|---|
| 2,865,521 A | * | 12/1958 | Fisher Chester et al. | 406/109 |
| 3,630,005 A | * | 12/1971 | Reinauer | 55/302 |
| 3,870,489 A | * | 3/1975 | Shaddock | 55/314 |
| 4,007,026 A | * | 2/1977 | Groh | 55/302 |
| 4,062,664 A | * | 12/1977 | Dupre et al. | 55/319 |
| 4,227,893 A | * | 10/1980 | Shaddock | 95/268 |
| 4,323,377 A | * | 4/1982 | Jolin | 55/341.7 |
| 4,574,420 A | * | 3/1986 | Dupre | 15/331 |
| 4,578,840 A | * | 4/1986 | Pausch | 15/352 |
| 5,073,259 A | * | 12/1991 | Solimar | 210/232 |
| 5,142,732 A | * | 9/1992 | Davis | 15/352 |
| 5,409,512 A | * | 4/1995 | Wilkerson et al. | 55/302 |
| 5,840,102 A | * | 11/1998 | McCracken | 95/268 |
| 5,996,171 A | * | 12/1999 | Bowers | 15/340.1 |
| 7,323,022 B1 | * | 1/2008 | Redlin | 55/319 |
| 7,806,948 B2 | * | 10/2010 | Brock et al. | 55/302 |
| 7,867,323 B2 | * | 1/2011 | Miller | 95/273 |

* cited by examiner

*Primary Examiner* — Duane Smith
*Assistant Examiner* — Minh-Chau Pham
(74) *Attorney, Agent, or Firm* — Robert M. Bauer

(57) ABSTRACT

A frac truck is provided for the portable metering and dispensing of sand into a fractionation fluid system. Hopper vessels for powder, sand or other aggregate have a discharge vent for releasing air that is displaced during the filling of the hoppers. Venting is required to prevent over pressurization; conventionally, this vented gas entrains a significant amount of solids that would subsequently be released into the atmosphere. A dust collector is mounted for receiving the vented air displaced when powdered material is loaded into the hoppers. The dust collector is connected through a vent tube communicating between the hoppers and the dust collector. Air vented from the hoppers is drawn though the dust collector and past and through a filter media, where clean air is discharged and solids collected. A low profile rotary airlock is used to discharge solids from the bottom of the dust collector.

10 Claims, 11 Drawing Sheets

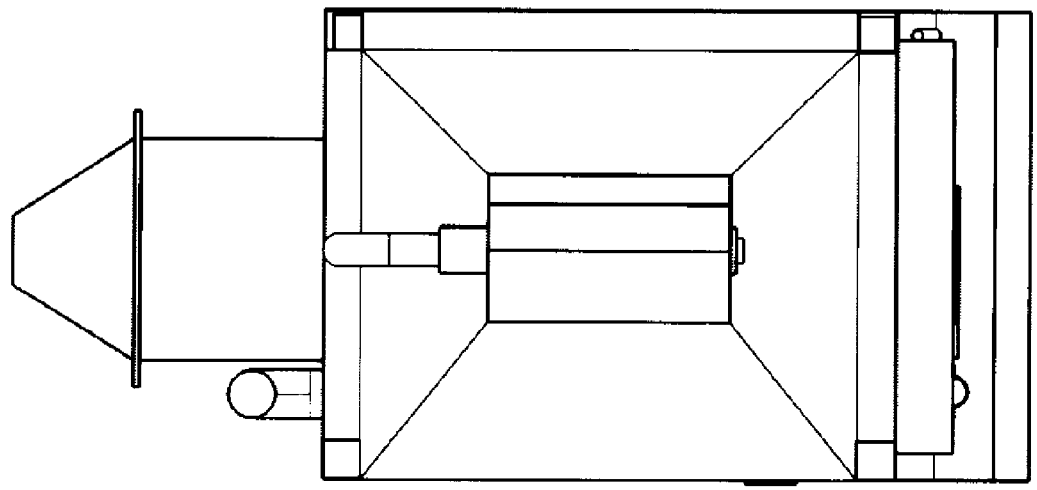
Fig. 11
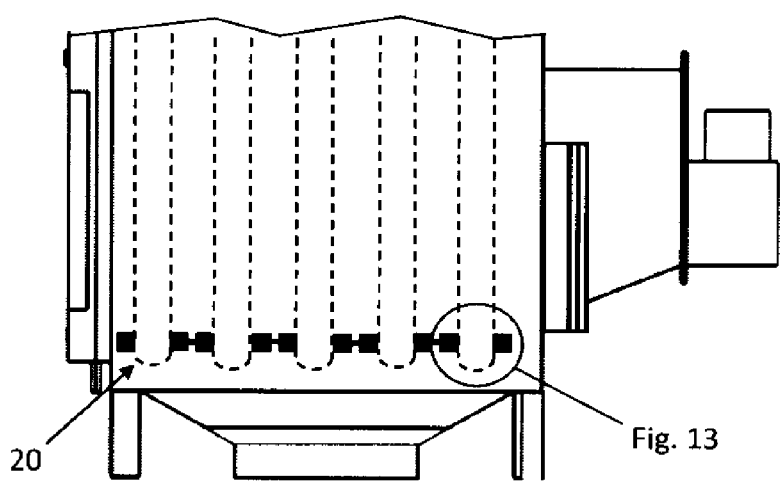
Fig. 12
20
Fig. 13

HYDRAULIC FRACTURING TRUCK SAND BAGHOUSE

RELATED APPLICATIONS

The present application was first described in, and claims the benefit of, U.S. Provisional Application 61/366,627, filed on Jul. 22, 2010 and incorporated by reference as if fully rewritten herein.

BACKGROUND OF THE INVENTION

1. Field of the Invention

The present invention relates to portable frac trucks and, more specifically, to a customize filter baghouse for use in conjunction with portable frac trucks.

2. Description of the Related Art

Hydraulic fracturing is the term describing the method used to increase or restore the rate at oil, gas or water, can be produced from a well. Wells located in unconventional reservoirs such as shale rock or coal beds are particularly heavy users of hydraulic fracturing. This technique enables the production of natural gas and oil from rock formations deep below the earth's surface where there may not be sufficient porosity and permeability to allow natural gas and oil to flow from the rock into the well bore and be recovered. The low natural permeability of shale and coal make creating conductive fractures in the rock essential to the economic production of gas from shale reservoirs. The fracture provides a conductive path connecting a larger area of the reservoir to the well, thereby increasing the are a from which natural gas and liquids can be recovered from the targeted formation.

The general objective to hydraulic fracturing is the increased amount of exposure a well has to the surrounding formation, and providing a conductive channel through which injected water or produced natural gas or oil can flow easily to or from the well. A hydraulic fracture is formed by pumping the fracturing fluid into the well bore at a rate sufficient to increase the pressure downhole to a value in excess of the fracture gradient of the formation rock. The pressure causes the formation to crack, allowing the fracturing fluid to enter and extend the crack further into the formation. To keep this fracture open after the injection stops, a solid proppant is added to the fracture fluid. The proppant, which is commonly a sieved round sand, is carried into the fracture. This sand is chosen to be higher in permeability than the surrounding formation, and the propped hydraulic fracture then becomes a high permeability conduit through which the formation fluids can flow to the well.

The injected fluid mixture is approximately 99.5% water and sand.

Hydraulic fracturing equipment used in oil and natural gas fields usually consists of a slurry blender, one or more high pressure, high volume fracturing pumps and a monitoring unit. Associated equipment includes fracturing tanks, a chemical additive unit (used to accurately monitor chemical addition) low pressure pipes and gauges for flow rate, fluid density, and treating pressure.

Typically, hydraulic fractures are placed in cased wellbores and the reservoir zones to be fractured are accessed by perforating the casing at those locations. Thus, the equipment is usually truck mounted to be able to be moved from well to well for servicing. Frac Trucks, sometimes called soup trucks, kettle trucks, frac trucks, or sand trucks, are used to haul frac sand or cement for gas well casings. The truck mounted equipment accurately meters and conveys a dry powder or granular material to a blender in a substantially closed system in order to contain and control any adverse environmental effects.

In operation, the frac truck, once positioned at the well site to be serviced, includes a storage tank to hold the dry powder or granular material (sand), a hopper for mixing and dispensing the granular material, a conveyor which delivers the dry powder or granular material to the hopper from the storage tank. As the hoppers are filled with fractioning sand, air is displaces from the hoppers and is discharged into the atmosphere. This displaced air entrains powder or sand in the process, creating an airborne environmental hazzard that, to date, has not been addressed.

Consequently, a need exists for a method of filtering or collecting any particulate material that is discharged through the vent opening when a vessel is being loaded.

SUMMARY OF THE INVENTION

A frac truck is provided for the portable metering and dispensing of sand into a fractionating fluid system. Hopper vessels for powder, sand or other aggregate have a discharge vent for releasing air that is displaced during the filling of the hoppers. Venting is required to prevent over pressurization; conventionally, this vented gas entrains a significant amount of solids that would subsequently be released into the atmosphere.

A dust collector is mounted for receiving the vented air displaced when powdered material is loaded into the hoppers. The dust collector is connected through a vent tube communicating between the hoppers and the dust collector. Air vented from the hoppers is drawn though the dust collector and past and through a filter media, where clean air is discharged and solids collected. A low profile rotary airlock is used to discharge solids from the bottom of the dust collector.

The present system fulfills the need that exists for a method of filtering or collecting any particulate material that is discharged when frac sand trucks are being loaded. Such a system decreases safety concerns for the operators of the frac sand trucks through elimination of dusty, hazardous breathing conditions.

Embodied in the present system are a number of novel features that allow for the truck mounted, portable system capable of being used in conjunction with new (or adapted to existing) frac sand trucks of otherwise conventional design and function. Accessibility for replacement of filter media is provided to allow for easy maintenance by operators in the field. Enclosed housings provide protective shielding for venting and pulsed air cleaning systems. A rotary airlock allows for discharge of accumulated solids in a controlled, safe manner, and the airlock's low profile nature allows for increased filtering volume of the overall system. A stabilizer plate and bushings are used to protect filter media during movement.

The novel features which are characteristic of the present invention, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 11 is a bottom plan view thereof;

FIG. 12 is a partial cross sectional view taken along line E-E of FIG. 5;

DETAILED DESCRIPTION OF THE PREFERRED EMBODIMENTS

Figure 1:
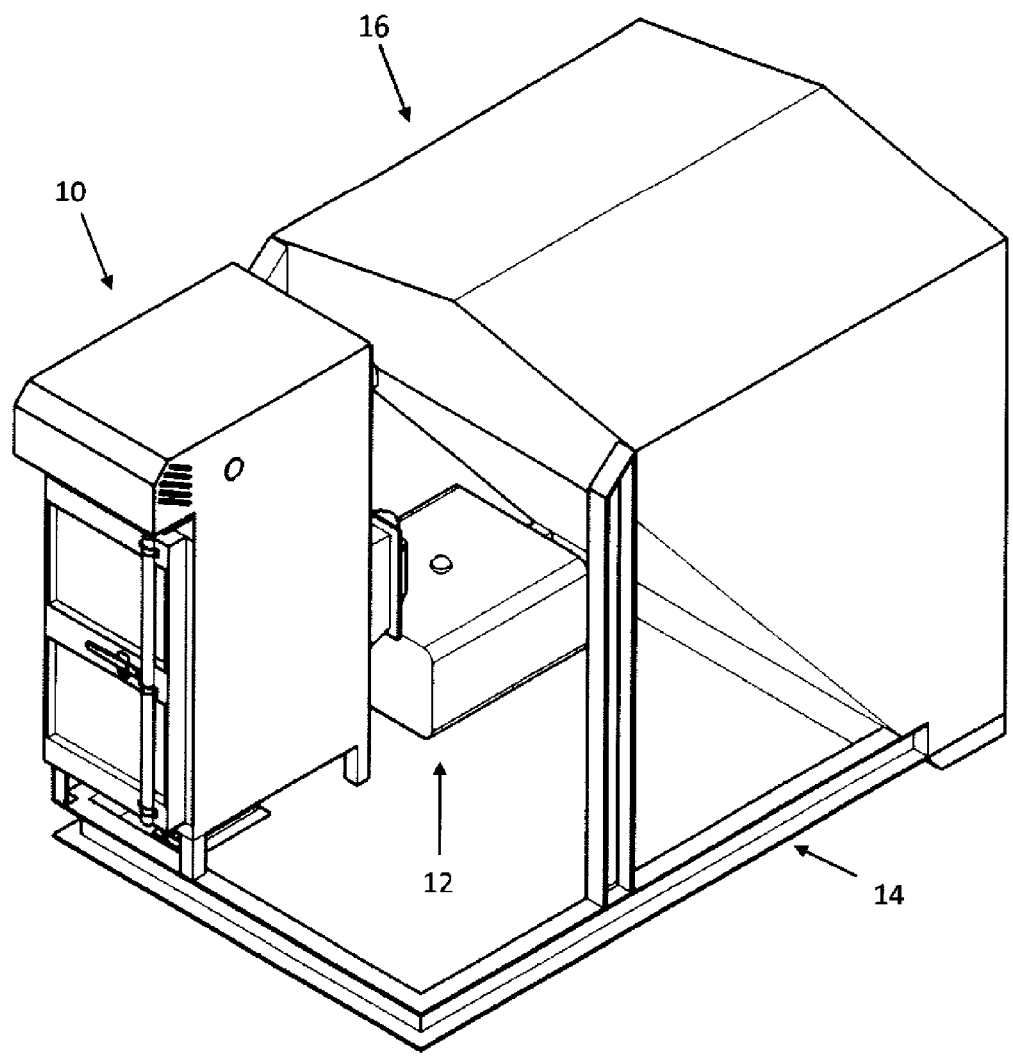
FIG. 1 is a partial perspective view of a hydraulic fracturing truck mounted sand baghouse according to a preferred embodiment of the present intention.
Figure 2:
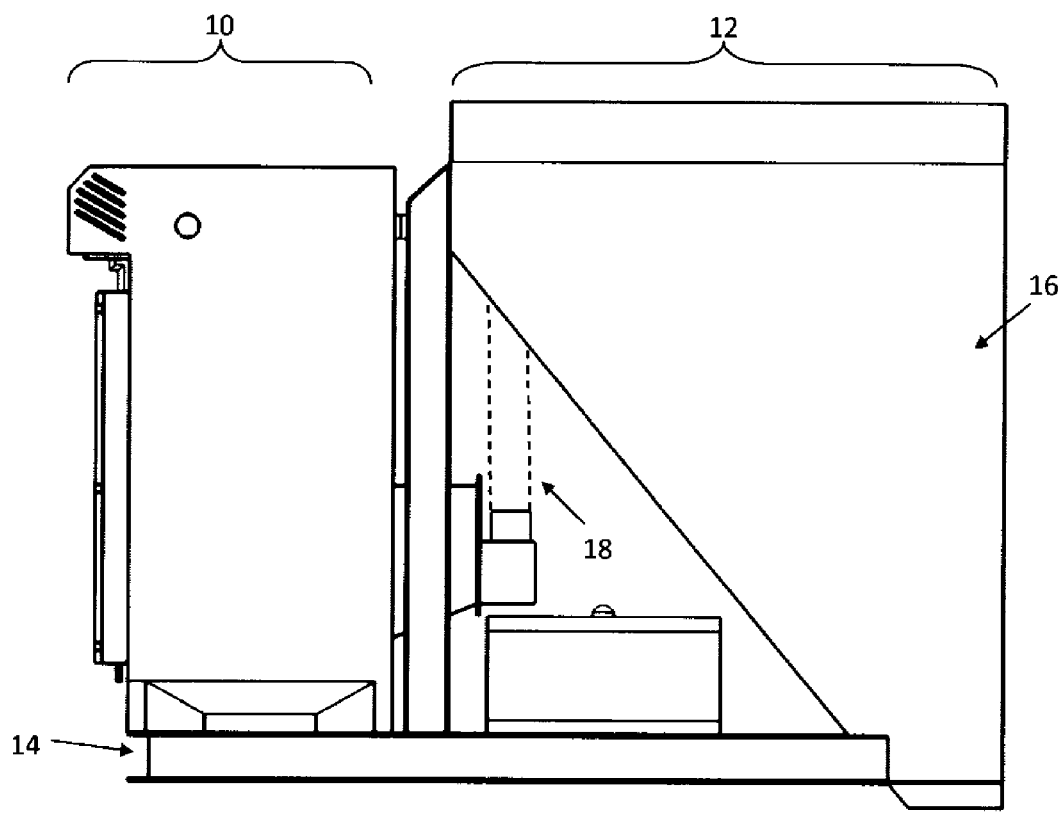
FIG. 2 is a side elevational view thereof.
Figure 3:
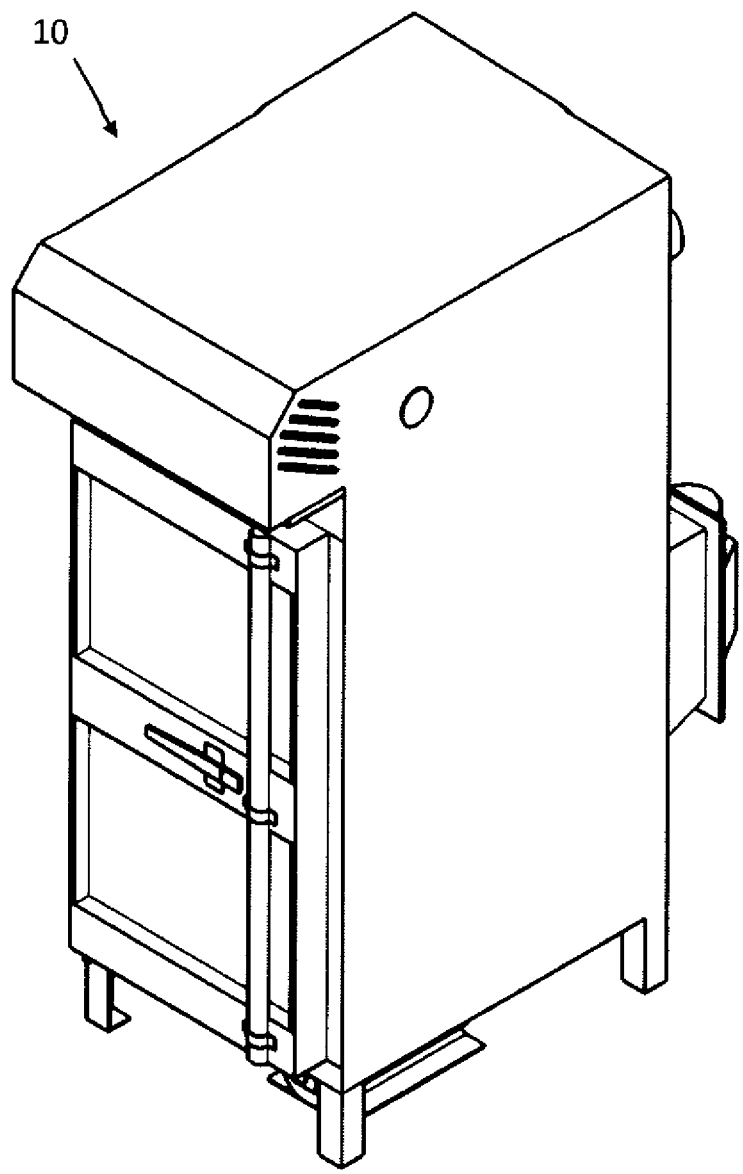
FIG. 3 is a detailed perspective view of the custom sand truck baghouse assembly for use therewith.
Figure 4:
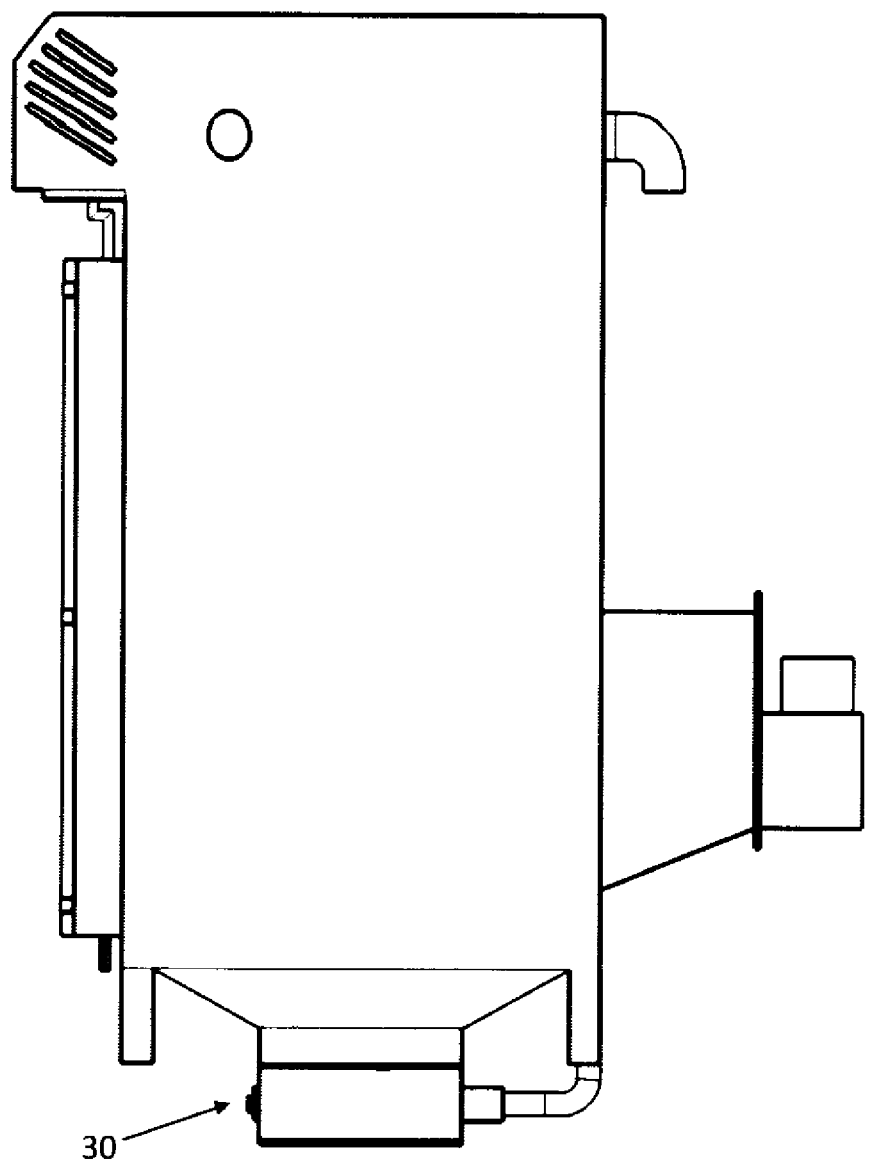
FIG. 4 is a left side elevational view thereof.
Figure 5:
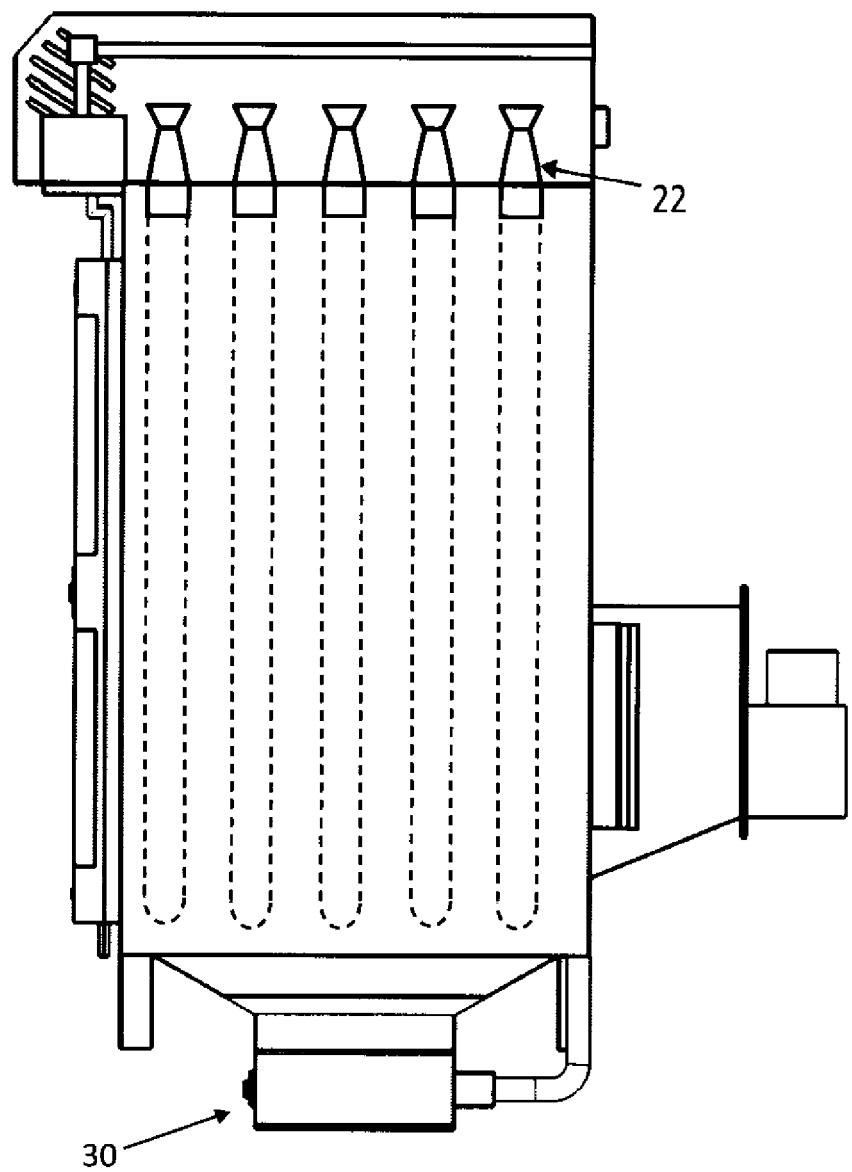
FIG. 5 is a cross sectional view taken along line B-B of FIG. 6.
Figure 6:
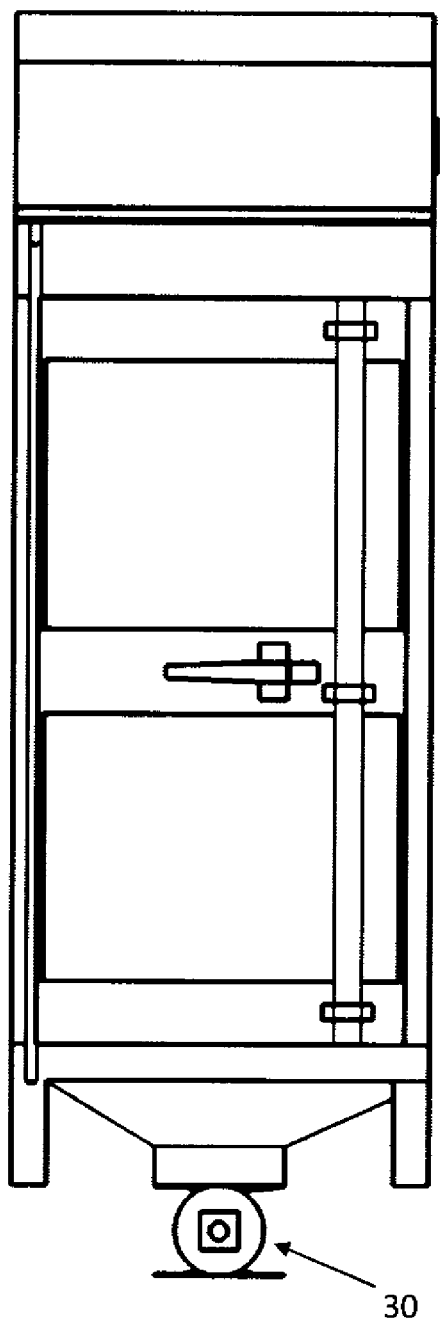
FIG. 6 is a front elevational view thereof.
Figure 7:
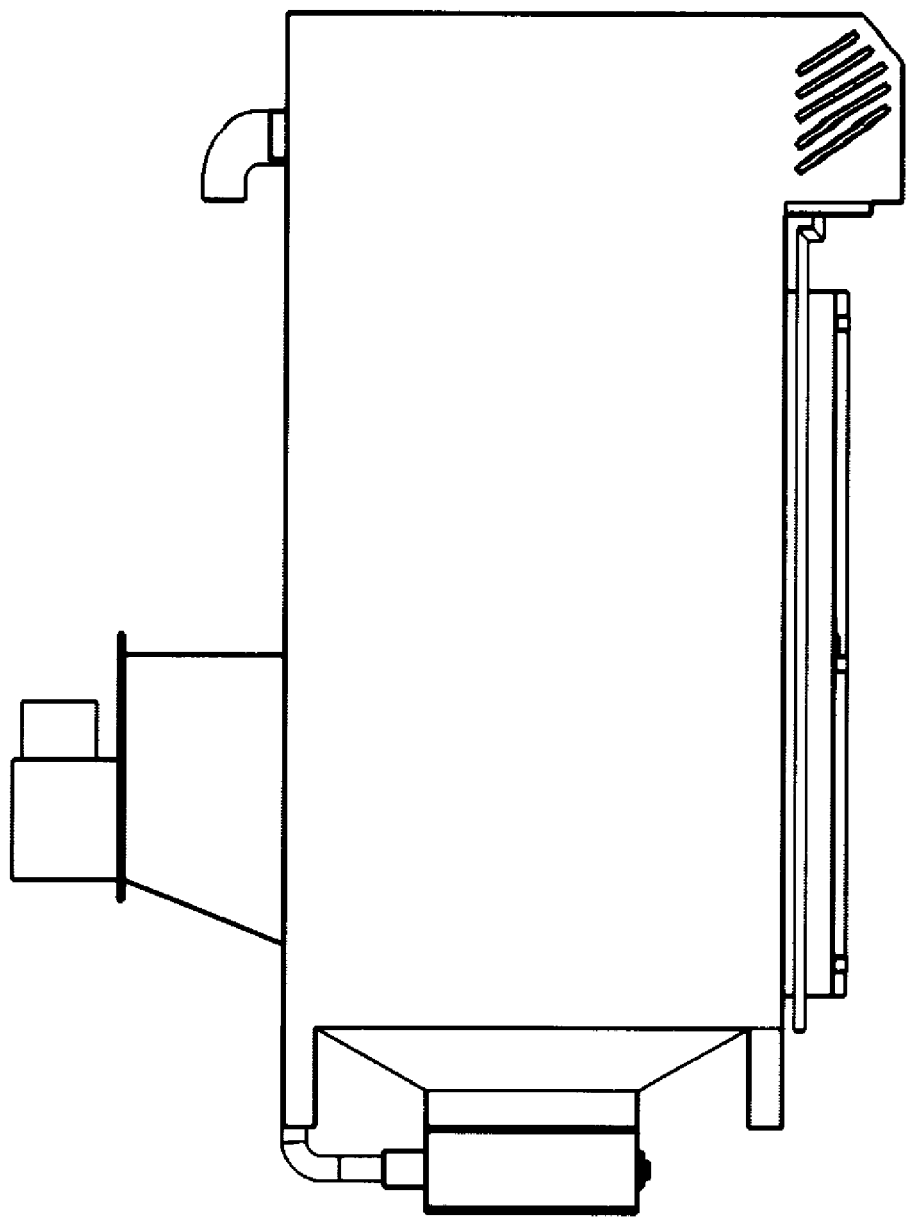
FIG. 7 is a right side elevational view thereof.
Figure 8:
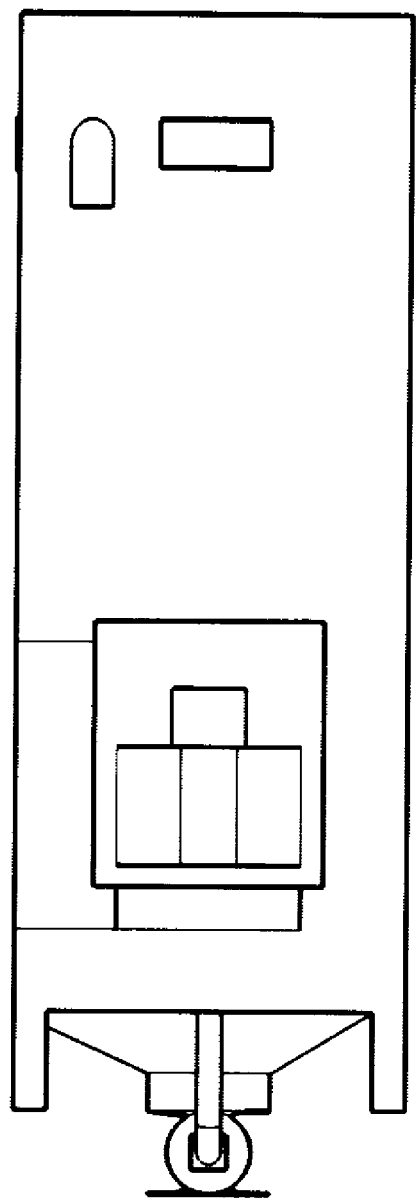
FIG. 8 is rear elevational view thereof.
Figure 9:
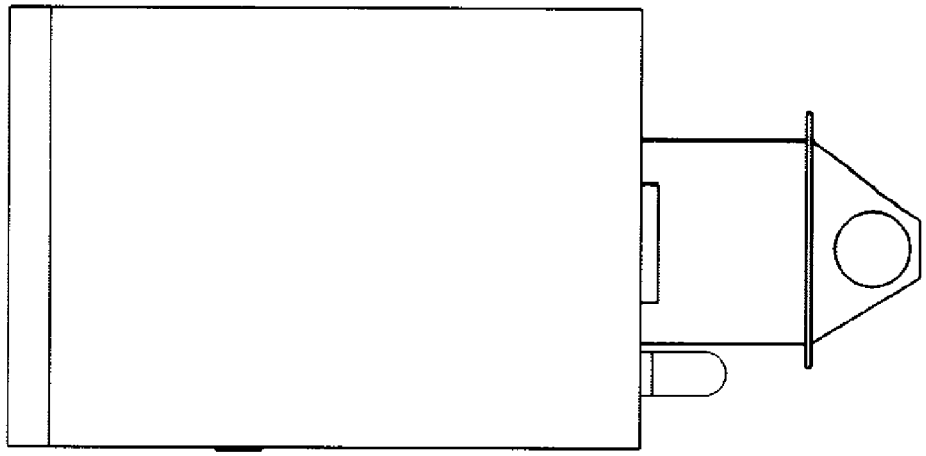
FIG. 9 is a top plan view thereof.
Figure 10:
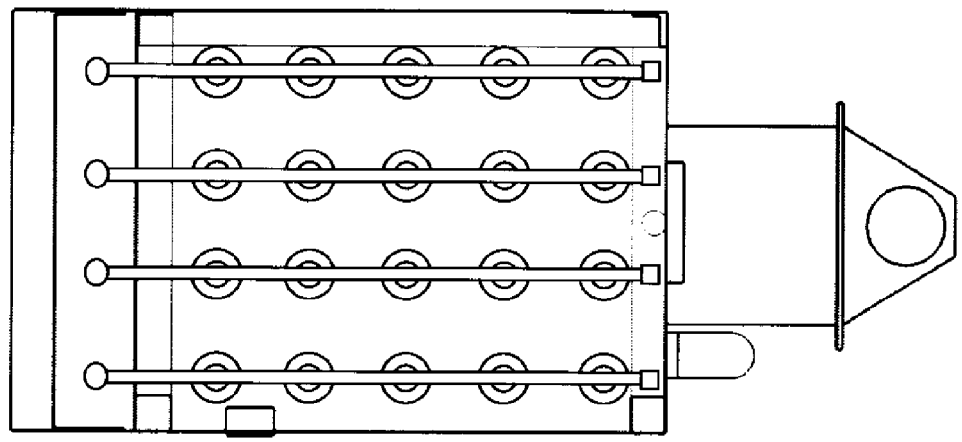
FIG. 10 is a cross sectional view taken along line A-A of FIG. 7.
Figure 13:
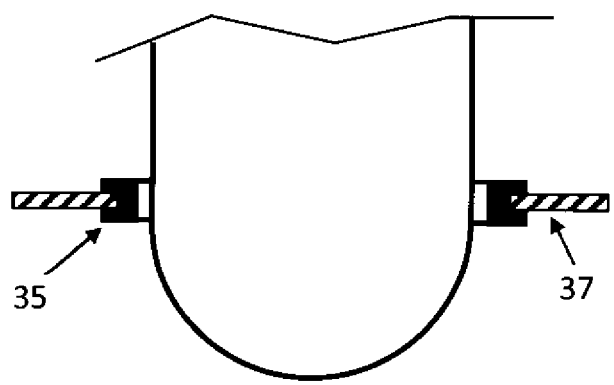
FIG. 13 is a detail view taken from FIG. 12.
Figure 14:
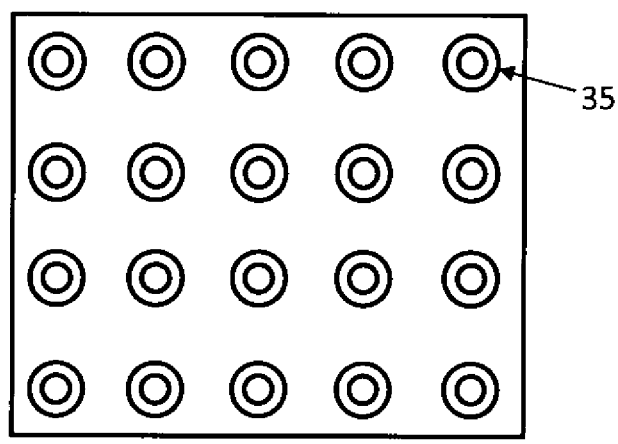
FIG. 14 is a detail plan view of the filter bag stabilizer plat that appears in FIG. 12.

Referring now to FIGS. 1-11, a customize filter baghouse, generally noted as filtering system 10, for use in conjunction with portable frac trucks, generally noted as 12, is shown according to the preferred embodiment of the present invention. The baghouse 10 is mounted to the frame support 14 of the truck to the rear of the hoppers or powder storage vessels 16. The hoppers 16 have an egress vent (not shown) for releasing air that is displaced as sand or other powder or aggregate material is metered into the hoppers 16. A discharge hose 18 is used to provide a fluid communication conduit to between the hoppers 16 and the filtering system 10.

The filtering system 10 has an overall outer housing that forms an internal filtering volume where solids entrained in the vented, displaced air from the hoppers 16 is filter, with solids separated and accumulated to the bottom of the housing and cleaned air discharged upward though the vents 22. A compressed air manifold 28 is used to distribute compressed air into the nozzles 22 in a reverse flow direction to allow for cleaning of the filter media in situ with pulsed, compressed air. The entire pulsed air cleaning system is further housed in a protective manner to accommodate impact and damage hazards that are anticipated to exist in the field use of truck mounted equipment. A filter bag stabilizing plate 37 is utilized along with stabilizing plat bag bushings 35 to protect the bags 20 during movement.

The foregoing descriptions of the specific embodiments of the present invention have been presented for the purposes of illustration and description. They are neither intended to be exhaustive nor to limit the invention to the precise forms disclosed and obviously, many modifications and variations are possible in light of the above teachings. The embodiments were chosen and described in order to best explain the principles of the invention and its practical application, to thereby enable others skilled in the art to best utilize the invention and its various embodiments with various modifications as are suited to the particular use contemplated. It is intended that the scope of the invention be defined by the Claims appended hereto and to their equivalents. Therefore, the scope of the invention is to be limited only by the following claims.

What is claimed is:

1. A frac truck for the portable metering and dispensing of sand into a fractionation fluid system comprising:

at least one hopper vessel for powder, sand or other aggregate and having a discharge vent in fluid communication with the atmosphere for releasing air that is displaced during filling of the hopper vessel;

a dust collector adapted for receiving the displaced air, said dust collector further containing a filter media through which said received displaced air is passed prior to discharge to the atmosphere;

said dust collector being integral and portably affixed to said frac truck; and entrains solids from the vented air that would subsequently be released into the atmosphere.

2. The frac truck of claim 1, wherein said dust collector further comprises a low profile rotary airlock through which collected solids are discharged.

3. The frac truck of claim 2, wherein said filter media is accessible and replaceable by operators in the field.

4. The frac truck of claim 3, further comprising a stabilizer plate and bushings adapted to protect said filter media during movement of said frac truck.

5. The frac truck of claim 1, further comprising:

a discharge hose to provide a fluid communication conduit to between the hopper vessel and the dust collector.

6. The frac truck of claim 5, further comprising:

a pulsed air cleaning system having a compressed air manifold for distribution of compressed air into nozzles in a reverse flow direction across the filter media in said dust collector to allow for cleaning of the filter media in situ with pulsed, compressed air.

7. The frac truck of claim 6, wherein said pulse air cleaning system is further housed in a protective manner to accommodate impact and damage hazards that may exist in the field use of truck mounted equipment.

8. A method for filtering the discharge volume of a frac truck collection hopper utilized for the portable metering and dispensing of sand into a fractionation fluid system, said method comprising:

affixing a dust collector system integrally and portably to a portable frac truck;

providing fluid communication between the discharge air from said frac truck collection hopper and said dust collector system;

adapting said dust collector system to receive displaced air and direct the displaced air across a filter media prior to discharge to the atmosphere.

9. The method of claim 8, wherein said step of affixing further comprising attaching a discharge hose between said portable frac truck collection hopper and said dust collector system.

10. The method of claim 8, wherein said dust collector collecting filtered solids at a bottom of said dust collector system and discharging the collected solids through a low profile rotary airlock.

\* \* \* \* \*